United States Patent [19]

Horan et al.

[11] Patent Number: 5,473,504

[45] Date of Patent: Dec. 5, 1995

[54] ELECTRIC METER WITH DESIRED SEATING TORQUE

[75] Inventors: Patrick J. Horan, Dover, N.H.; David J. Miller, South Berwick, Me.

[73] Assignee: General Electric Company, Schenectady, N.Y.

[21] Appl. No.: 364,108

[22] Filed: Dec. 27, 1994

[51] Int. Cl.$^6$ ...................................................... H02B 1/00
[52] U.S. Cl. ........................... 361/667; 324/110; 324/156
[58] Field of Search ......................... 174/66, 67; 324/110, 324/156, 157; 361/659–672

[56] References Cited

U.S. PATENT DOCUMENTS

4,110,814  8/1978  Britton et al. ............................ 361/668
5,364,290  11/1994 Hartman .................................. 361/659

Primary Examiner—Gregory P. Thompson
Attorney, Agent, or Firm—Bell, Seltzer, Park & Gibson

[57] ABSTRACT

An electric meter has reduced torque needed during relative rotation of a cover and base during a predetermined portion of rotation between initial and locked positions to thereby facilitate securing of the cover and base together at a predetermined seating torque. The torque reduction is preferably provided by a plurality of base ridges connected to the base mating surface adjacent respective clip receiving slots, and a plurality of cover projections connected to the cover mating surface. The cover projections slidably contact adjacent base ridges on the base mating surface to thereby reduce friction during the portion of rotation between the initial and locked positions. A gasket is preferably positioned between the base mating surface and the cover mating surface.

20 Claims, 9 Drawing Sheets

ELECTRIC METER WITH DESIRED SEATING TORQUE

FIELD OF THE INVENTION

The present invention relates to electric meters for measuring electricity, and, more particularly, to an electric meter having a base and a cover secured thereto.

BACKGROUND OF THE INVENTION

The housing of a conventional meter for measuring electric energy consumption, for example, typically comprises a base and a cylindrical cover secured to the base and enclosing the internal meter components. The cover typically includes a series of circumferentially spaced apart clips for securing the cover to the base. Attachment of the cover to the base is accomplished by positioning the cover on top of the base, aligning the clips with corresponding slots in a flange on the base, and then rotating the cover relative to the base. Rotation of the cover causes the clips to grip the base flange and deflect slightly, producing a torque of between 2 and 10 foot-pounds in cooperation with a sealing gasket positioned between cover and base flange.

The desired seating torque range for securing a conventional meter cover to its base is 2 to 6 foot-pounds. When the torque exceeds this range, the cover may become difficult to remove by hand, and a special tool may be required for removal. Additionally, the cover clips may break if the torque range is exceeded by rotating the cover too far.

When the seating torque falls below the desired range, such as if the cover is not rotated far enough relative to the base, the cover may become disengaged from the meter base during shipping and handling. A low seating torque is also unacceptable because a meter is often handled by its cover while the base carries the major components, and, hence, weight of the meter. For example, in removing a meter from a socket, 30 to 120 pounds of force may be placed on the cover.

The service environment of most electric meters presents additional problems related to the seating torque of the base and cover. Conventional meter bases are manufactured from a thermosetting phenolic resin which is susceptible to both shrinkage and swelling. Because phenolic resins are hygroscopic, humidity and other moisture may cause the base to swell by as much as 3%, resulting in an unacceptably high torque which leads to difficulty in removing the cover or in causing permanent deformation of the plastic cover clips. Furthermore, exposure to high temperatures can cause the base to shrink by as much as 3%, resulting in unacceptably low or no seating torque which may cause the cover to become loose relative to the base during service. Accordingly, the selection of materials and the proper initial assembly seating torque are important for a long meter service life.

SUMMARY OF THE INVENTION

It is therefore an object of the present invention to provide an electric meter that may be readily assembled to a desired seating torque sufficient to prevent unintended separation of the base and cover, such as during handling or shipping, or as a result of the service environment.

This and other objects, features and advantages of the present invention are provided by an electric meter including torque reducing means positioned between a cover mating surface and a base mating surface. The torque reducing means decreases friction during the rotation of the cover from the initial position to the locked position.

The torque reducing means is preferably provided by a plurality of base ridges connected to the base mating surface and a plurality of cover projections connected to the cover mating surface. The cover projections slidably contact the base ridges to thereby reduce friction during the predetermined portion of rotation between the initial and locked positions.

More particularly, the base preferably includes a flange portion having a plurality of spaced apart openings, such as circumferential notches, adjacent a periphery thereof defining clip receiving slots. This base flange further has a pair of opposing surfaces defining a base mating surface and a back surface. The cover is removably secured to the base, and the cover preferably includes a generally cylindrical body and a cover flange connected thereto. The cover flange has a surface defining a cover mating surface positioned adjacent the base mating surface. A gasket is preferably positioned between the base mating surface and the cover mating surface.

The cover also preferably includes a cover skirt depending from the cover flange. A plurality of cover clips are connected to the cover skirt for positioning through the clip receiving slots in the base flange when the cover is in an initial position. The clip receiving slots and cover clips are preferably equally spaced about the periphery of the base flange and cover flange, respectively, and are preferably three in number. The cover and base are preferably relatively rotated about 20° between the initial and locked position.

The cover clips slidably engage the back surface of the base flange upon relative rotation of the cover with respect to the base from the initial position to the locked position. In the locked position, the cover clips urge the base and cover mating surfaces together with the gasket frictionally engaged therebetween and thereby defines a predetermined seating torque for the cover and base. The predetermined seating torque is preferably in a range of about 2 to 6 foot-pounds to prevent unintended separation of the base and cover, such as during transportation or handling.

Each of the cover projections and base ridges are preferably positioned radially outward from the gasket. In addition, each of the cover projections includes respective tapered end portions to smoothly engage a corresponding base ridge so that rotation is readily initiated and so that a camming effect is produced as the cover and base are rotated and approach the locked position.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
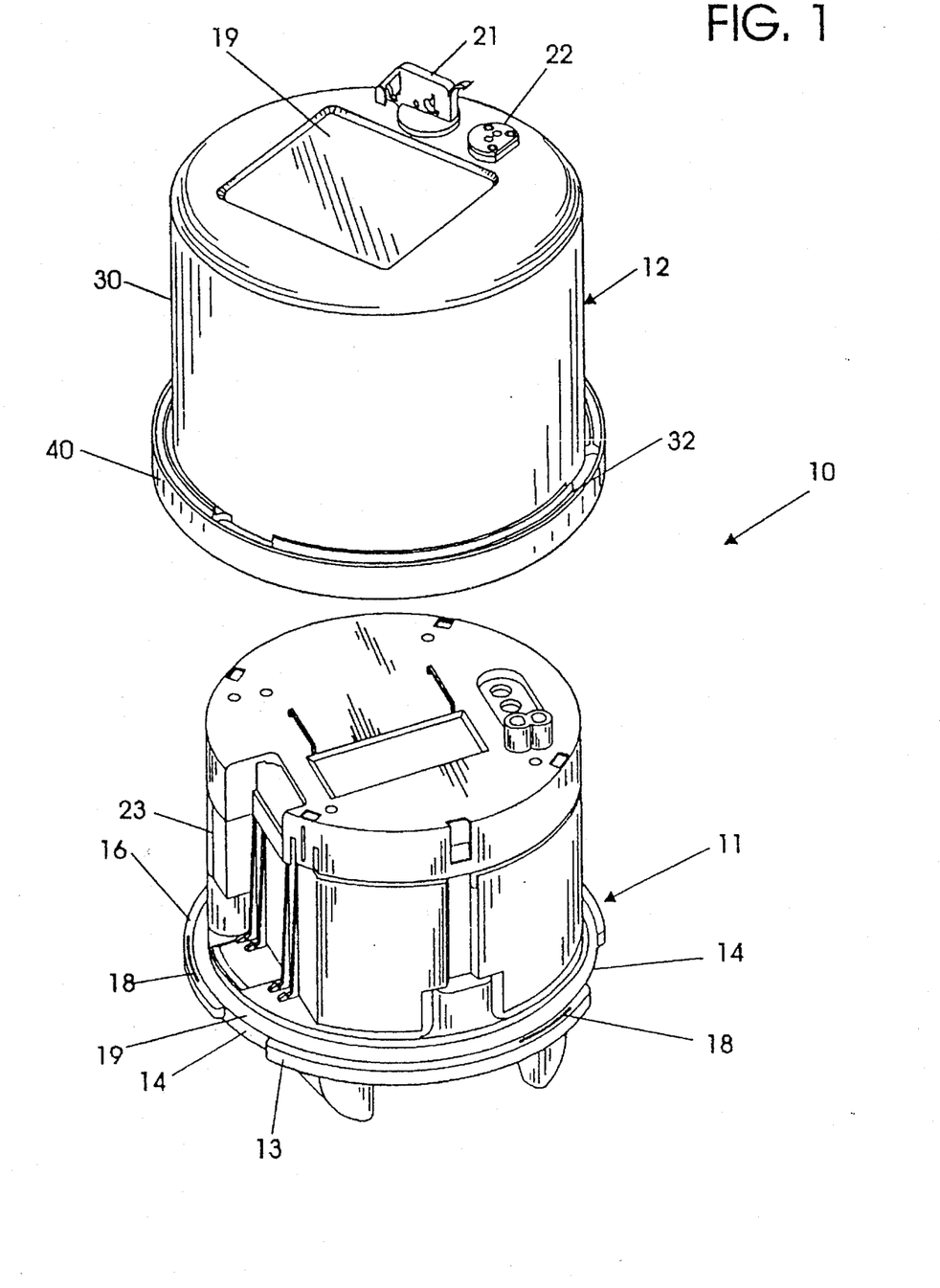
FIG. 1 is an exploded view of an electric meter according to the present invention.
Figure 2:
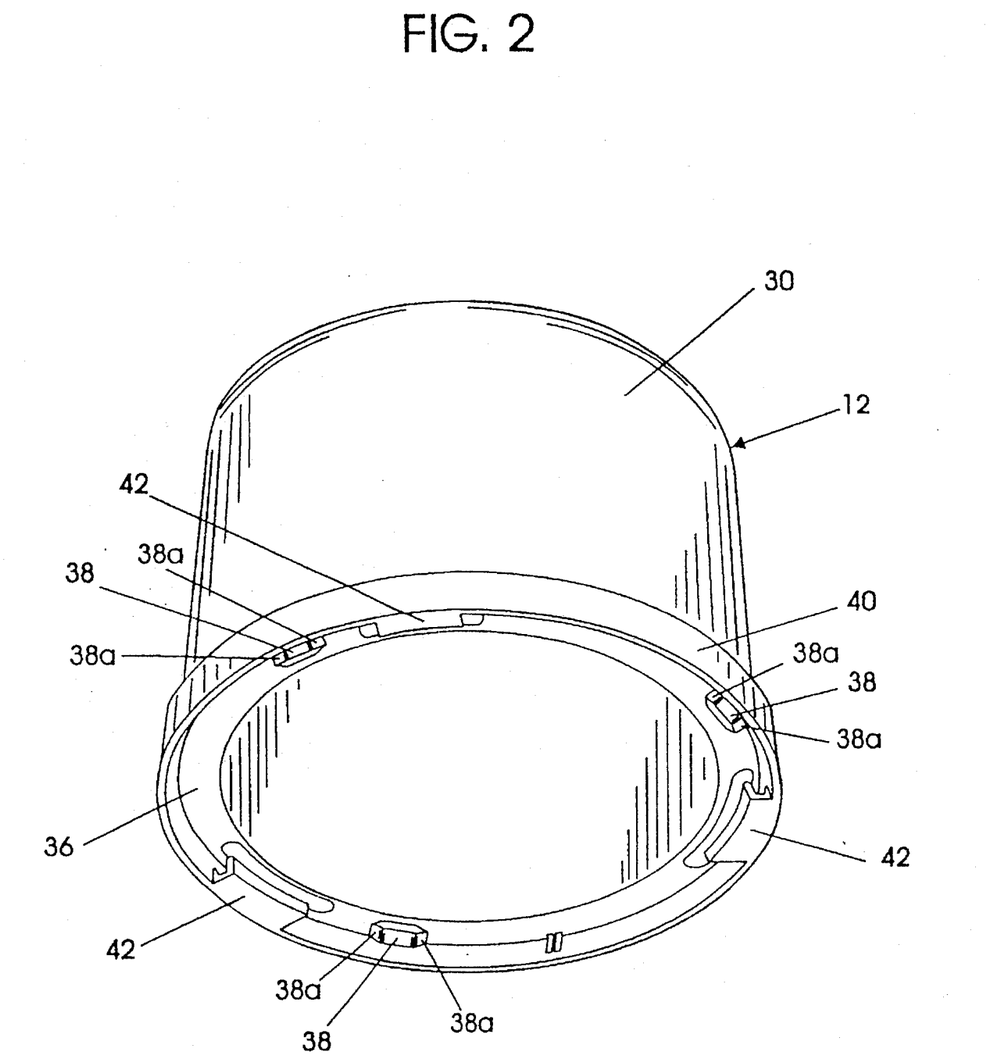
FIG. 2 is a bottom perspective view of the meter cover as shown in FIG. 1.
Figure 3:
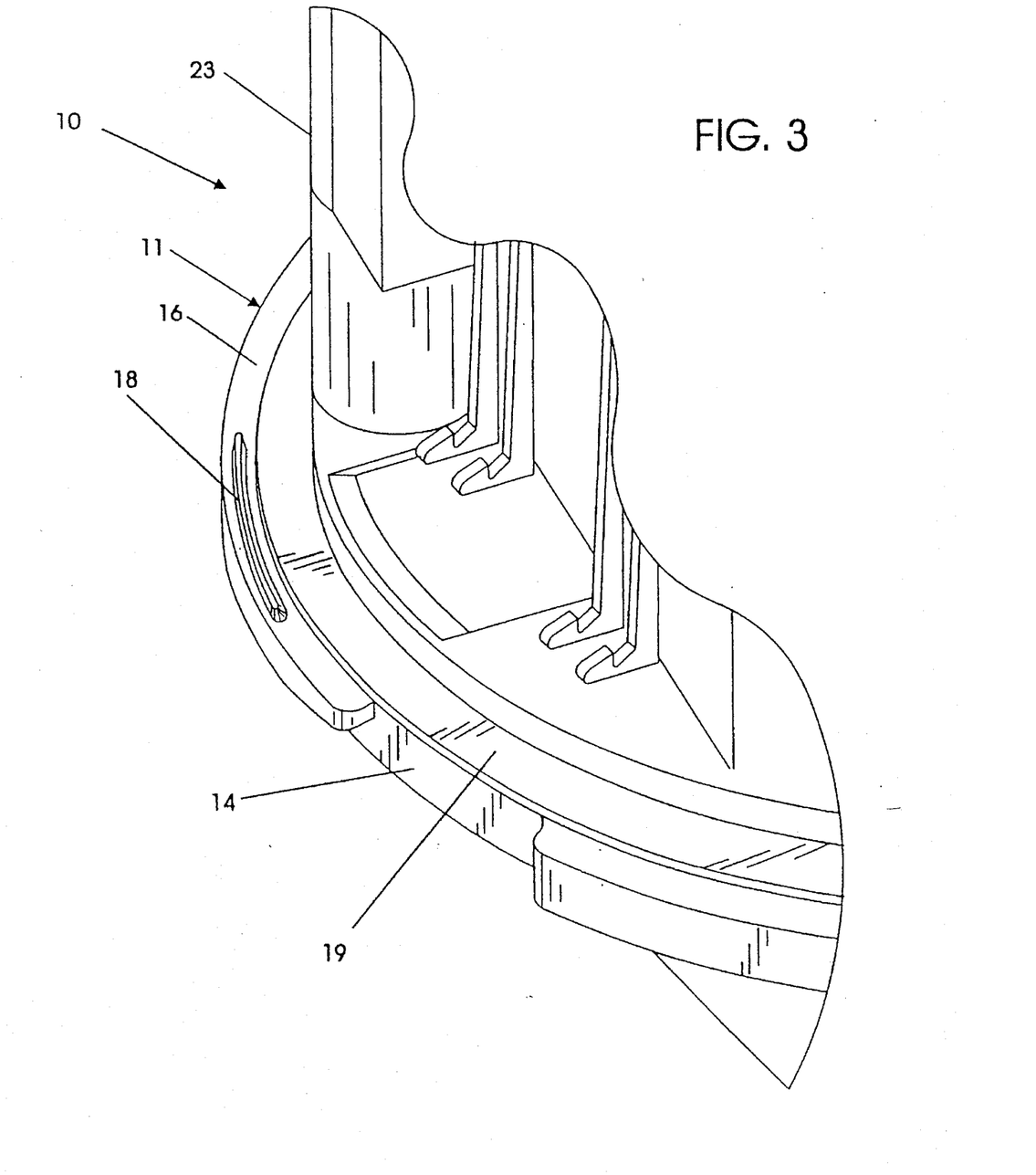
FIG. 3 is a greatly enlarged fragmentary view of the meter base as shown in FIG. 1.

Referring initially to FIGS. 1–3, the present invention is an electric meter 10 for measuring electricity, such as watthours, varhours or other quantities, as would be readily understood by those skilled in the art. The meter 10 includes a generally circular base 11, a generally cylindrical cover 12, and torque reducing means for facilitating securing the cover to the base at a predetermined seating torque. A switch cover 21 is pivotally connected to the outer face of the cover 12. The switch cover 21 is movable between open and closed positions to permit access to a rotatable plunger switch, such as for resetting the meter 10, and as would be readily understood by those skilled in the art.

In the illustrated embodiment, the meter components, such as electronics, are mounted to the base 11 and contained within a shroud 23. In addition, a viewing window 19 and an optical reader port 22 are also provided on the outer face of the housing, as would also be readily understood by those skilled in the art.

The base 11 preferably includes a base flange 13 having a plurality of openings, such as the illustrated outwardly opening notches, adjacent the periphery thereof defining clip receiving slots 14. The base flange 13 further has an upper surface 16 for mating with the cover, and a back surface 17 (FIG. 5) opposite the upper surface. The upper surface 16 of the base flange 13 preferably includes a plurality of ridges 18 which provide the torque reducing means as described in greater detail below. The clip receiving slots 14 are preferably equally spaced about the periphery of the base flange. The ridges 18 are also preferably equally spaced about the upper surface 16 of the base flange 13. In the illustrated embodiment, there are three clip receiving slots 14 and three ridges 18 on the upper or mating surface 16 of the base flange 13. The ridges 18 are preferably adjacent the clip receiving slots 14 as illustrated.

A ring-shaped sealing gasket 19 is positioned on the upper surface 16 of the base flange 13 in a location radially inward from the ridges 18 and seals the cover 12 to the base 11 when assembled. The gasket 19 preferably has a thickness of approximately 0.045 inches and is preferably made from rubber or any other suitable moisture-resistant material as would be readily understood by those of skill in the art.

Referring now more particularly to FIG. 2, the meter cover 12 will be more fully described. The cover 12 preferably includes a generally cylindrical body 30 having a closed upper end, and a cover flange 32 connected to the cover body at the lower open end thereof. The cover flange 32 defines a cover mating surface 36 including a plurality of cover projections 38 or bumps as illustrated. In addition, the cover includes a cover skirt 40 which is connected to the cover flange 32 adjacent the periphery of the cover mating surface 36.

As shown in the illustrated embodiment, a plurality of cover clips 42 are connected to the lower end of cover skirt 40. The cover clips 42 and the cover projections 38 are preferably equally spaced about the cover skirt 40 and cover mating surface 36, respectively. In the illustrated embodiment, there are three cover clips 42, and three cover projections 38 corresponding to the number of clip receiving slots 14.

The base 11, base flange 13, and the base ridges 18 on the base flange are preferably integrally molded from a thermosetting phenolic resin. The cover 12, cover flange 32, cover projections 38, cover skirt 40, and cover clips 42 are preferably integrally molded from a thermoplastic polycarbonate material, such as Lexan®.

Assembly of the cover 12 to the base 11 is accomplished by positioning the cover over the base, as illustrated in FIG. 1, inserting the cover clips 42 into aligned clip receiving slots 14, and rotating the cover, with respect to the base, approximately 20°. The cover clips 42 engage the back surface 17 of the base flange 13 and slide along the flange as the cover is rotated from the initial position to the locked position.

The stiffness of each cover clip 42 may preferably compress the gasket 19 at least about 10% to thereby prevent moisture penetration. The cover clips 42 may also desirably handle loads up to about one-half of the yield strength of Lexan®, with temporary capability to withstand greater loads, such as during disassembly of the cover 12 and base 11.

The preferred seating torque range for assembly of the cover 12 in the locked position is 2 to 6 foot-pounds. Accordingly, long term service reliability is ensured in view of typical variations in temperature and humidity. In addition, handling and transportation of the meter 10 are facilitated.

Each of the cover projections 38 and base ridges 18 are preferably positioned radially outward from the gasket 19. In addition, the cover projections 38 include tapered end portions 38a to smoothly engage the base ridges 18. The base ridges are preferably raised about 0.030 inches above the adjacent surface of the base flange 13. The cover projections 38 preferably extend about 0.020 inches from the adjacent cover mating surface.

Figure 4:
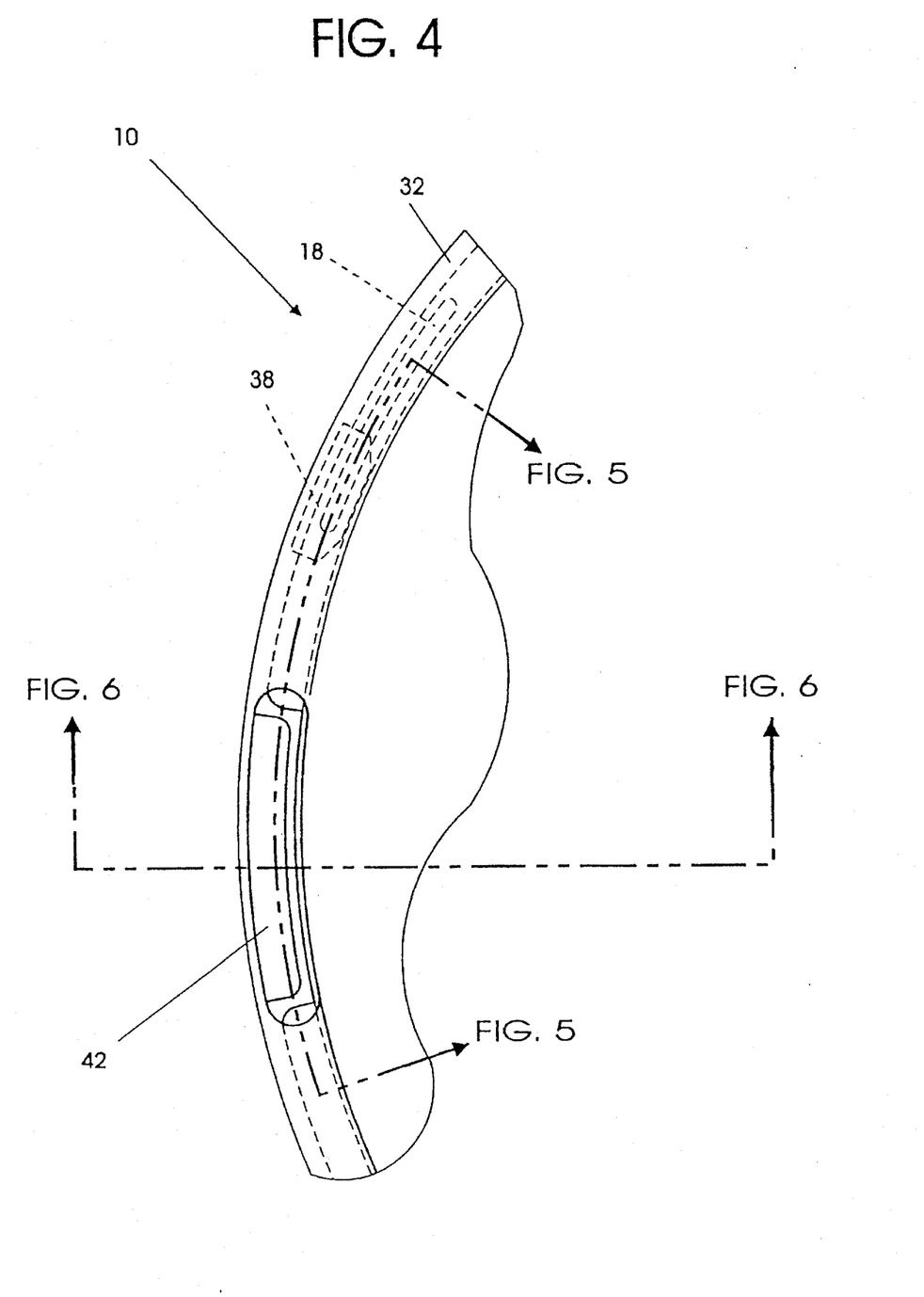
FIG. 4 is a fragmentary plan view of an edge portion of the meter as shown in FIG. 1 with the cover in the initial position.
Figure 5:
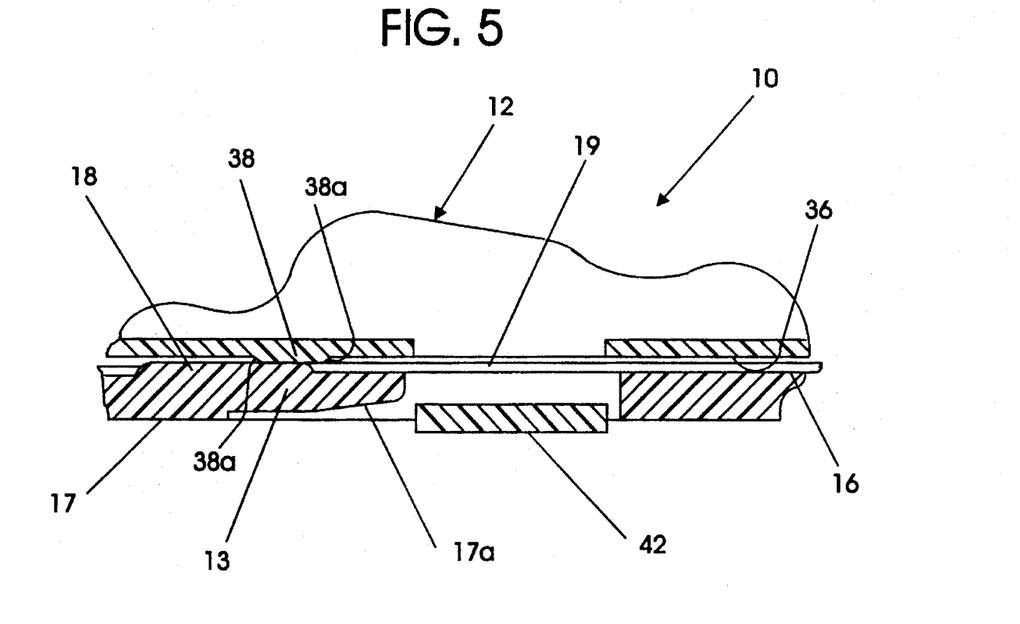
FIG. 5 is a cross-sectional view taken along lines 5—5 in FIG. 4.
Figure 6:
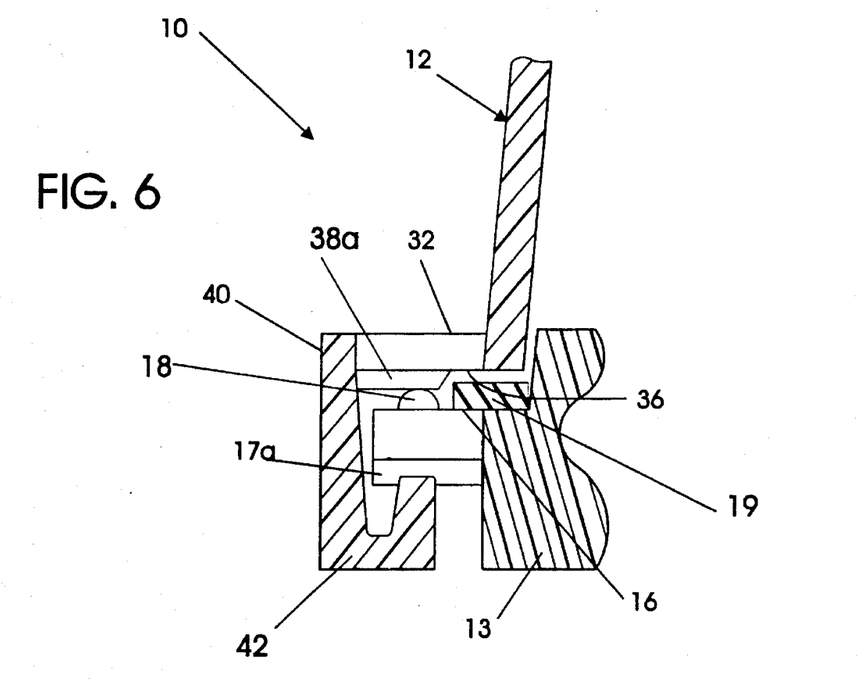
FIG. 6 is a cross-sectional view taken along lines 6—6 in FIG. 4.

Referring now to FIGS. 4 through 12, the torque reducing means will be more fully described. In the initial assembly position (FIGS. 4, 5 and 6), the cover 12 is placed over the base 11 such that each cover clip is engaged with its respective clip 42 receiving slot 14 in the base flange 13. In this initial position, each cover projection 38 is in contact with a respective base ridge 18 such that the cover mating surface 36 is kept from compressing the gasket 19 located on the base flange 13. The cover clip 42 is located within the clip receiving slot 14 but has not engaged the bottom surface 17 of the base flange. In another embodiment of the invention, in the initial position the tapered end portions of the cover projections 38 may be immediately adjacent the base ridges 18 rather than in overlying relationship as illustrated in FIGS. 4–6.

In the illustrated embodiment, the leading portion 17a of the bottom surface 17 of the base flange 13 adjacent each clip receiving slot 14 has a tapered thickness to facilitate initial rotation of the cover 12 in a clockwise direction.

Figure 7:
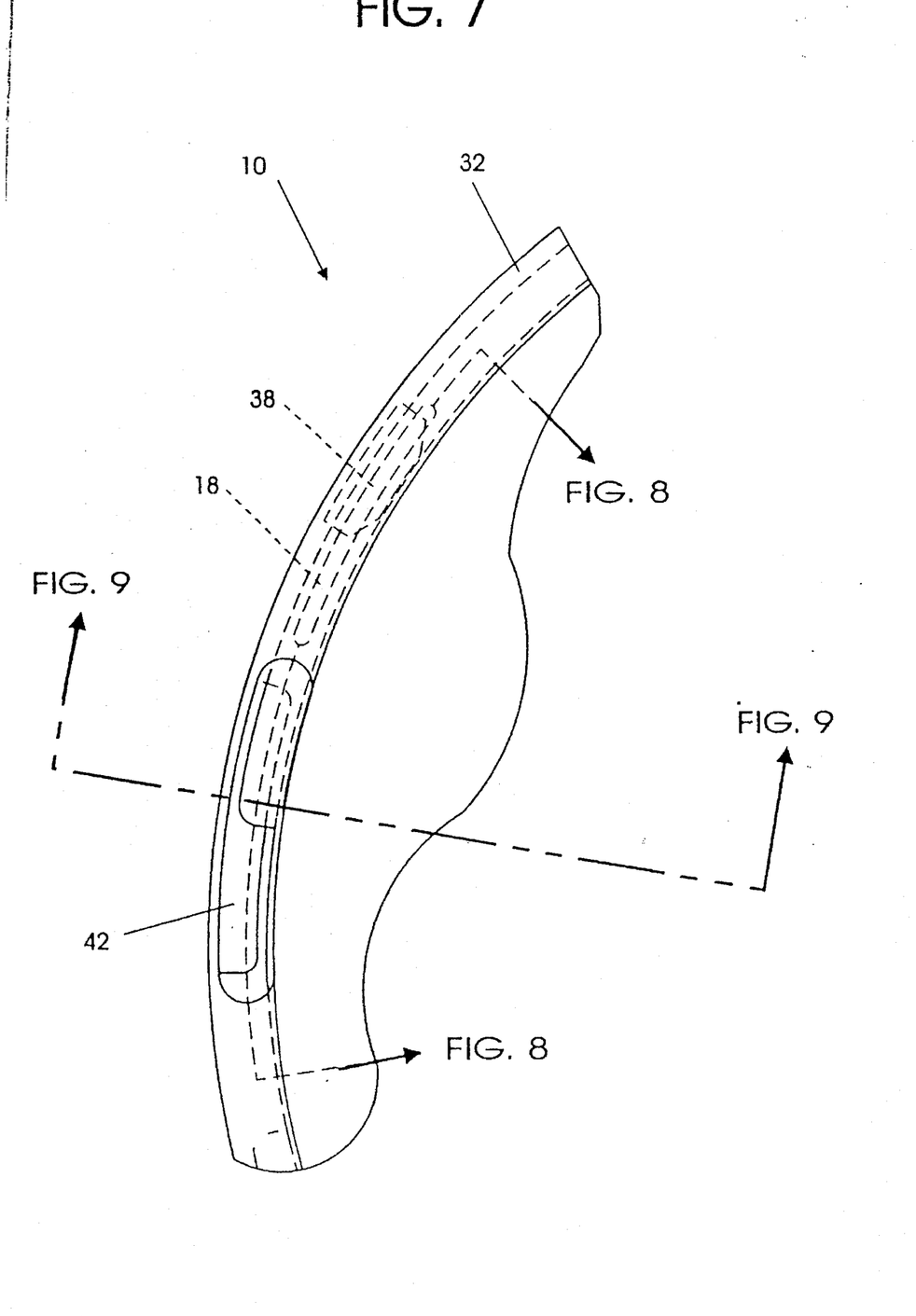
FIG. 7 is a fragmentary plan view of an edge portion of the meter shown in FIG. 1 with the cover in an intermediate position.
Figure 8:
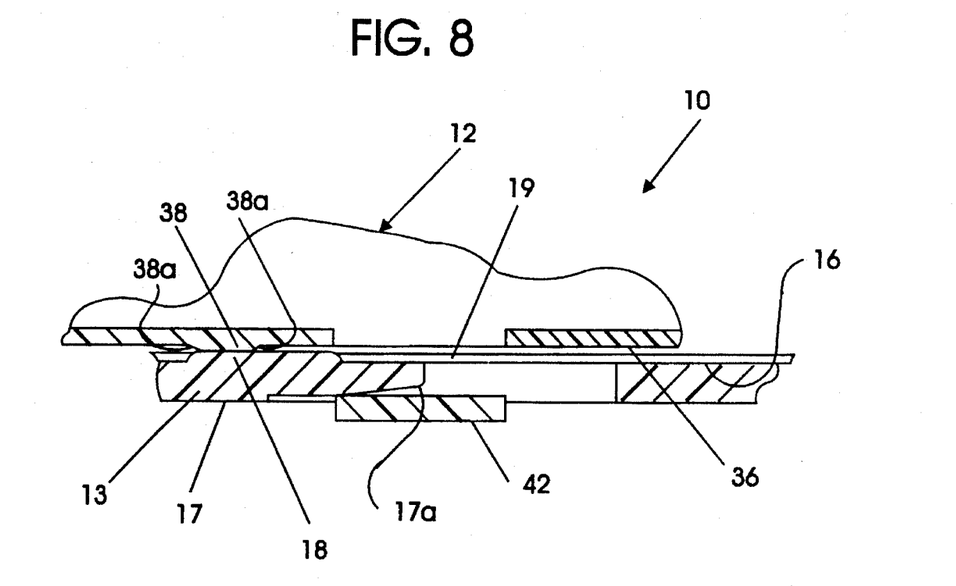
FIG. 8 is a cross-sectional view taken along lines 8—8 in FIG. 7.
Figure 9:
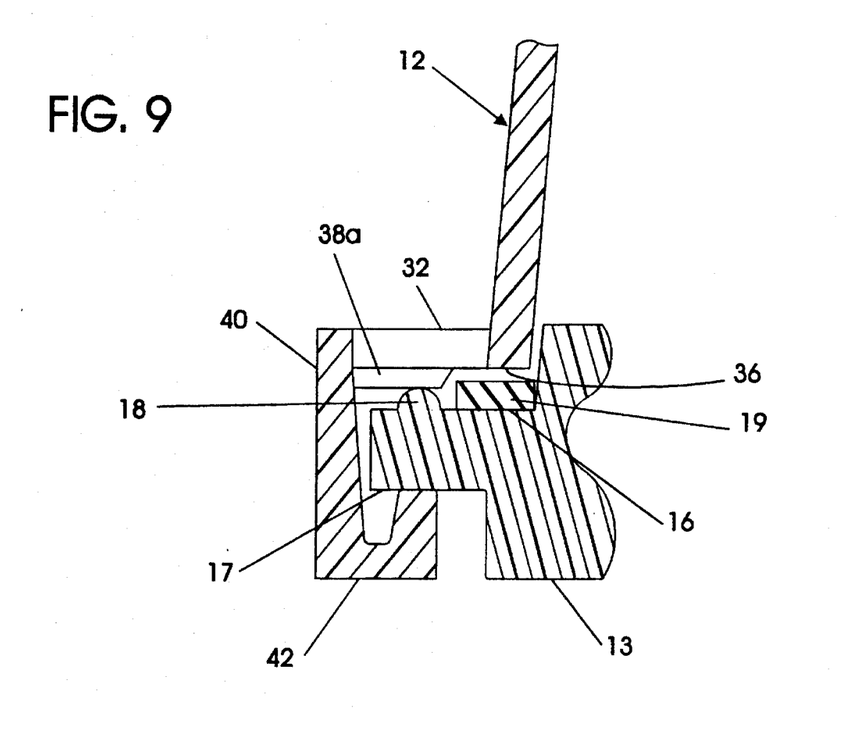
FIG. 9 is a cross-sectional view taken along lines 9—9 in FIG. 7.

The cover 12 may be rotated in a clockwise direction such that each cover projection 38 is advanced towards the opposite end of its respective base ridge 18 while each cover clip 42 engages the back surface of the base flange. FIGS. 7, 8 and 9 illustrate the relative location of a cover projection 38, base ridge 18, and cover clip 42 in an intermediate assembly position as the cover 12 is rotated relative to the base 11.

The cover clip 42 is deflected as it slidably engages the bottom surface 17 of the base flange 13 to thus urge the cover 12 and base 11 together. Because each cover projection 38 contacts its respective base ridge 18, the cover mating surface 36 is spaced from the gasket 19 so that relatively low torque is needed to rotate the cover 12 with respect to the base 11. Preferably, the gap between the cover mating surface 36 and the gasket 19 is about 0.005 inches.

Figure 10:
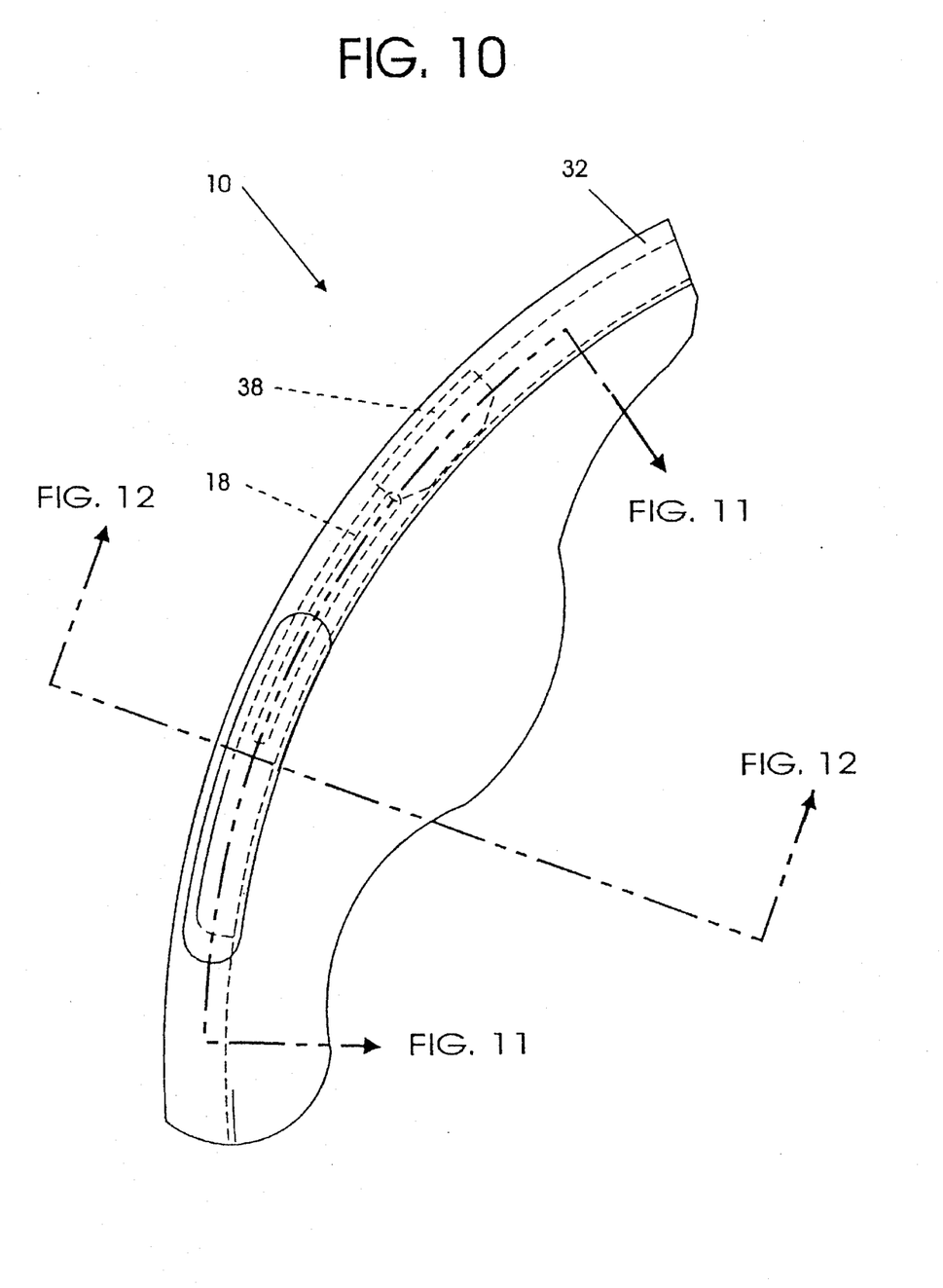
FIG. 10 is a fragmentary plan view of an edge portion of the meter shown in FIG. 1 with the cover in the locked position.
Figure 11:
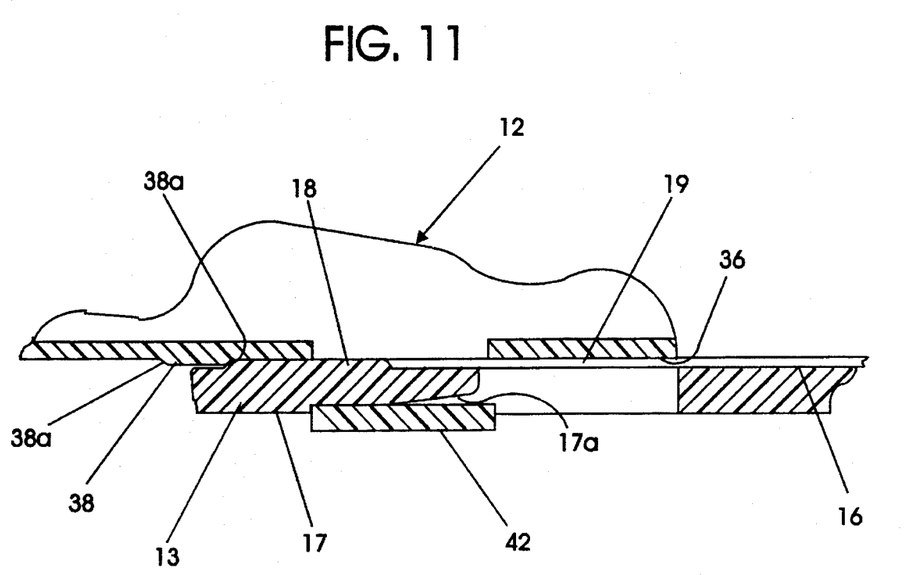
FIG. 11 is a cross-sectional view taken along lines 11—11 in FIG. 10.
Figure 12:
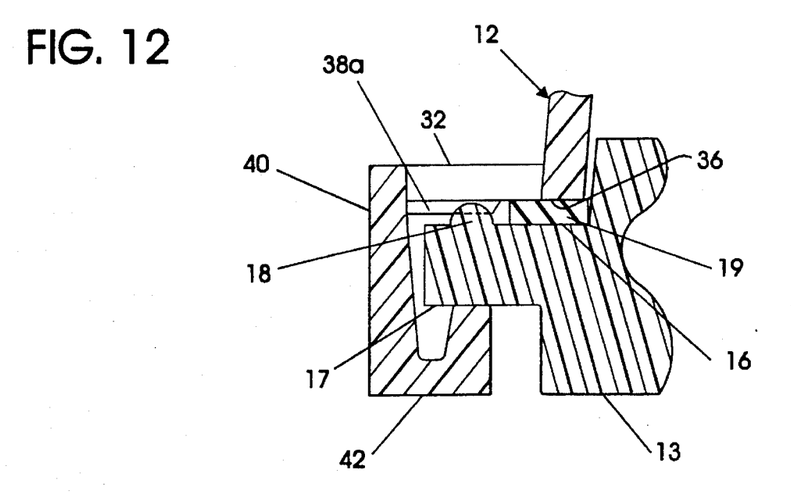
FIG. 12 is a cross-sectional view taken along lines 12—12 in FIG. 10.

Referring now to FIGS. 10–12, the locked position is explained. The cover 12 has been rotated in a clockwise direction such that each cover projection 38 has passed over its respective base ridge 18. The tapered edge 38a of the cover projection 38 provides a camming action to further ensure that the cover 12 advances to the locked position.

The cover clip 42 is deflected as a result of engagement with the bottom surface 17 of the base flange 13. However, because each cover projection 38 is no longer overlying its respective base ridge 18, the cover mating surface 36 is compressing the gasket 19 located on the base mating surface 16. In a preferred embodiment, the gap between each cover projection 38 and the base mating surface 16 is about 0.0205 inches in the locked position.

The force produced by the deflection of the cover clips 42 compresses the gasket 19 by a minimum of about 10%, to thereby prevent moisture penetration even in poor conditions, such as after exposure to 85° C. for 1,000 hours.

The torque reducing means provided by the cover projections 38 and the base ridges 18 ensures that the cover 12 is rotated sufficiently to achieve, without exceeding, a desired seating torque. Because friction is reduced when the cover projections 38 are in contact with the base ridges 18, rotation of the cover 12 is relatively easy up to the locked position, wherein rotational resistance increases significantly because the cover mating surface 36 is in contact with and compressing the gasket 19 on the base flange 13. As the technician feels an increase in resistance to rotation, the cover 12 is in the desired position and at the desired seating torque of between about 2 to 6 foot-pounds.

The cover projections 38 and their respective base ridges 18 also prevent the cover 12 from unintentional rotation in an anti-clockwise direction once in the locked position. Consequently, the possibility of the cover 12 becoming inadvertently separated from the base 11 during shipping or handling is reduced. The possibility of the cover 12 becoming separated from the base 11 as a result of heat-induced shrinkage of the base or other environmental conditions is also reduced.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An electric meter for measuring electricity and comprising:

a base and a base flange connected thereto, said base flange having a plurality of spaced apart openings therein defining clip receiving slots, said base flange further having a pair of opposing surfaces defining a base mating surface and a back surface;

a cover removably secured to said base, said cover comprising a generally cylindrical body and a cover flange connected thereto, said cover flange having a surface defining a cover mating surface positioned adjacent the base mating surface;

a cover skirt depending from said cover flange;

a plurality of cover clips connected to said cover skirt for positioning through said clip receiving slots when said cover is in an initial position and for slidably engaging the back surface of said base flange upon relative rotation of said cover and base from the initial position to a locked position wherein said cover clips urge the base mating surface and cover mating surface together and define a predetermined seating torque for said cover and base; and torque reducing means positioned between the cover mating surface and the base mating surface for reducing torque needed during a predetermined portion of relative rotation of said cover and said base between the initial and locked positions to thereby facilitate securing of said cover and said base together at the predetermined seating torque.

2. An electric meter according to claim 1 wherein said torque reducing means comprises:

a plurality of base ridges connected to the base mating surface adjacent respective clip receiving slots; and a plurality of cover projections connected to the cover mating surface and slidably contacting adjacent base ridges on the base mating surface to reduce friction during the predetermined portion of rotation between the initial and locked positions.

3. An electric meter according to claim 2 further comprising a gasket positioned between the base mating surface and the cover mating surface, and wherein said cover projections and said base ridges are positioned radially outward from said gasket.

4. An electric meter according to claim 2 wherein each of said cover projections include respective tapered end portions to smoothly engage a corresponding base ridge.

5. An electric meter according to claim 1 wherein said base and said base flange are integrally molded thermosetting phenolic plastic.

6. An electric meter according to claim 1 wherein said cover, said cover flange, and said clips are integrally molded polycarbonate plastic.

7. An electric meter according to claim 1 wherein the clip receiving slots are equally spaced about a periphery of said base flange and the predetermined number of the clip receiving slots is three.

8. An electric meter according to claim 1 wherein the predetermined seating torque is the range of about 2 to 6 foot-pounds.

9. An electric meter according to claim 1 wherein the locked position is about 20° from the initial position.

10. An electric meter for measuring electricity and comprising:

a base and a base flange connected thereto, said base flange having a plurality of circumferentially spaced apart notches on a periphery thereof defining clip receiving slots, said base flange further having a pair of opposing surfaces defining a base mating surface and a back surface;

a cover removably secured to said base, said cover comprising a generally cylindrical body and a cover flange connected thereto, said cover flange having a surface defining a cover mating surface positioned adjacent the base mating surface;

a gasket positioned between the base mating surface and the cover mating surface;

a cover skirt depending from said cover flange;

a plurality of cover clips connected to said cover skirt for positioning through said clip receiving slots when said cover is in an initial position and for slidably engaging the back surface of said base flange upon relative rotation of said cover and said base from the initial position to a locked position, wherein said cover clips urge the base mating surface and cover mating surface together with said gasket frictionally engaged therebetween and define a predetermined seating torque for said cover and base;

a plurality of base ridges connected to the base mating surface adjacent respective receiving clip slots; and a plurality of cover projections connected to the cover mating surface and slidably contacting adjacent base ridges on the base mating surface to reduce friction during a predetermined portion of rotation between the initial and locked positions.

11. An electric meter according to claim 10 wherein said cover projections and said base ridges are positioned radially outward from said gasket.

12. An electric meter according to claim 10 wherein each of said cover projections include respective tapered end portions to smoothly engage a corresponding base ridge.

13. An electric meter according to claim 10 wherein said base and said base flange are integrally molded thermosetting phenolic plastic.

14. An electric meter according to claim 10 wherein said cover, said cover flange, and said cover clips are integrally molded polycarbonate plastic.

15. An electric meter according to claim 10 wherein the clip receiving slots are equally spaced about the periphery of said base flange and the predetermined number of the clip receiving slots is three.

16. An electric meter according to claim 10 wherein the predetermined seating torque is the range of about 2 to 6 foot-pounds.

17. An electric meter according to claim 10 wherein the locked position is about 20° from the initial position.

18. An electric meter for measuring electricity and comprising:

a base and a base flange connected thereto, said base flange including means for defining a plurality of circumferentially spaced apart clip receiving slots, said base flange further having a pair of opposing surfaces defining a base mating surface and a back surface;

a cover removably secured to said base, said cover comprising a body and a cover flange connected thereto, said cover flange having a surface defining a cover mating surface positioned adjacent the base mating surface;

a gasket positioned between the base mating surface and the cover mating surface;

cover clip means connected to said cover flange for defining a plurality of clips positioned through respective clip receiving slots when said cover is in an initial position and for slidably engaging the back surface of said base flange upon relative rotation of said cover and said base from the initial position to a locked position wherein said cover clips urge the base mating surface and cover mating surface together with said gasket frictionally engaged therebetween and define a predetermined seating torque for said cover and base; and torque reducing means positioned between the cover mating surface and the base mating surface for reducing torque needed during relative rotation of said cover and said base during a predetermined portion of rotation between the initial and locked positions to thereby facilitate securing of said cover and said base together at the predetermined seating torque.

19. An electric meter according to claim 18 wherein said torque reducing means comprises:

a plurality of base ridges connected to the base mating surface adjacent respective receiving clip slots; and a plurality of cover projections connected to the cover mating surface and slidably contacting adjacent base ridges on the base mating surface to reduce friction during the predetermined portion of rotation between the initial and locked positions.

20. An electric meter according to claim 19 wherein each of said cover projections and said base ridges are positioned radially outward from said gasket.

* * * * *